March 27, 1951     E. KLEPETKO     2,546,364
RESIN MELTING
Filed July 3, 1947     2 Sheets-Sheet 1
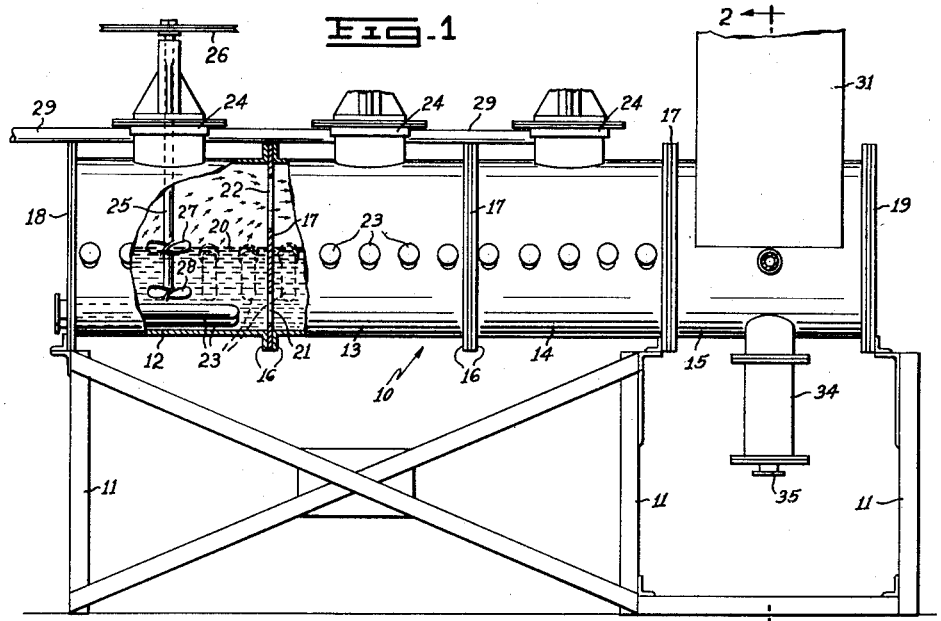
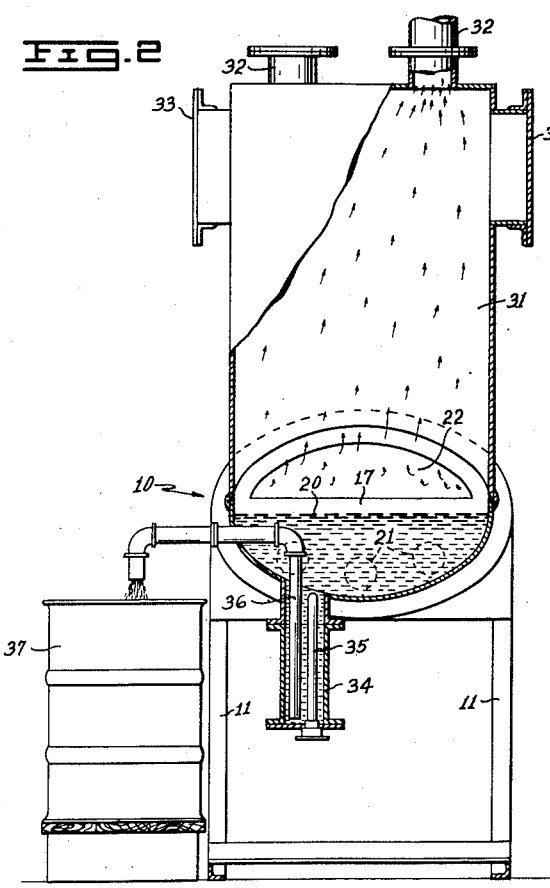
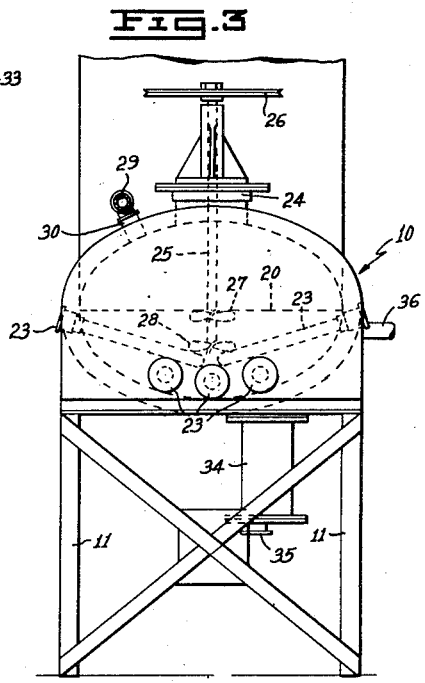
INVENTOR
ERNEST KLEPETKO
ATTORNEYS March 27, 1951 E. KLEPETKO 2,546,364
RESIN MELTING
Filed July 3, 1947 2 Sheets-Sheet 2

INVENTOR
ERNEST KLEPETKO
BY
Pennie, Edmonds, Morton and Barrows
ATTORNEYS

Patented Mar. 27, 1951

2,546,364

UNITED STATES PATENT OFFICE 2,546,364

RESIN MELTING

Ernest Klepetko, Bauer, Utah, assignor to Combined Metals Reduction Company, Stockton, Utah, a corporation of Utah Application July 3, 1947, Serial No. 758,843

10 Claims. (Cl. 260—107)

This invention relates to melting resins and the like, and is particularly directed to the provision of an improved method and improved apparatus for melting a resin and for concurrently separating it from a volatile material.

In a copending application Serial No. 677,393, filed June 17, 1946, now Patent 2,506,300, Philip de B. Kaye, Lester J. Hartzell and I have described an improved process for refining impure resin concentrates obtained, for example, from resin-bearing Utah coal. The process therein described involves extracting the resin with a volatile solvent and subsequently evaporating the solvent from the resin. The method and apparatus of the present invention are particularly well adapted for melting the refined resin product thus produced, and may be used as a final step in that process for separating the resin from the solvent and concurrently recovering the resin as a melted product, but are not limited to this particular use.

Melting natural resins is not a particularly easy thing to do on a large scale, because they are easily damaged by overheating, or even by prolonged heating at the temperature at which they are fluid; and their poor heat conductivity makes it difficult to avoid overheating or prolonged heating. If the resin contains any significant amount of a readily volatile resin solvent, such as the low-boiling volatile solvent used in the process of our aforementioned copending application Serial No. 677,393, the difficulty involved in melting the resin is greatly increased. A resin product containing a small amount of a volatile solvent, which product is substantially solid at room temperature, upon being heated for melting, first turns to a thick liquor, then as solvent evaporates changes to a molasses-like consistency, then to a viscous tarry state, and finally reverts to the solid state even before actual melting begins. During the period while the resin is passing through these liquid stages, the solvent vaporizes and the evolved vapor forms bubbles and foam throughout the viscous mass. The bubbles and foam greatly interfere with transfer of heat to the material, thus impeding progress of the melting operation; and they cause the resin, when it reverts to the solid state prior to melting, to appear in the form of extremely fine particles. The resulting finely-divided solid resin is light and fluffy, and a considerable part of it is easily carried away by the current of escaping solvent vapor. The part that remains behind is in a form that is an excellent heat insulator, through which heat for melting can be transmitted only with extreme slowness.

It is known that to some extent the above-described difficulties may be overcome by adding to the solvent-containing resin a second solvent having a boiling range between the temperature at which the first solvent boils and the temperature at which the resin itself melts. (Natural resins do not have a sharp melting temperature. In referring to the melting temperature of a resin in this specification, we mean a temperature high enough for the uncontaminated resin to be in the form of an easily poured liquid.) The purpose of the second solvent is to maintain the resin in liquid form until its melting temperature has been reached, and to minimize foaming. While it accomplishes these purposes fairly effectively, its use leads to still other difficulties that are undesirable in a large-scale resin-melting operation. For example, extra heat is required for volatilizing the second solvent, and special equipment is required to condense it, after it has been volatilized, and to separate it from the low-boiling solvent originally present with the resin. Also, it is difficult to eliminate all of the second solvent from the resin, even after the latter has been melted. The present invention provides an improved resin-melting method that does not require the addition of a second solvent.

In accordance with the most advantageous practice of my invention, a body of melted resin is established in a suitably heated vessel, and the incoming resin to be melted is delivered at the surface of said body. The body of melted resin is vigorously agitated adjacent its upper surface and near the region where the incoming resin is introduced. The solvent or other volatile material thus is flash-evaporated, and the released resin is quickly incorporated into the body of already molten resin. Concurrently, the body of molten resin is also vigorously agitated well beneath its upper surface, near where it is in contact with the heating surface by which it is heated. In consequence of this agitation in the depths of the body, the incoming resin that has been incorporated into the body is quickly melted by its intimate contact with the heated already molten resin.

A second relatively quiescent body of molten resin, communicating with the first agitated and heated body thereof, preferably is also established and maintained. Molten resin is passed from the agitated body to the quiescent body, and there any residual volatile material that has been entrapped in the molten resin by the agitation of the first body has an opportunity to escape. Melted resin may be withdrawn directly from the quiescent body. Preferably, however, a third body of molten resin, communicating with the second quiescent body, is maintained in a sump at an elevation well below the bottom level of the quiescent body. This third body of molten resin in the sump may be heated to a temperature somewhat higher than is employed for actual melting, in order to facilitate pouring the resin, and the melted resin is withdrawn from near the bottom level of the sump. Vaporized volatile material is withdrawn from over the quiescent body, and may be passed to apparatus designed to effect its recovery, if such is desired. The third body of molten resin in the sump serves as a gas seal preventing escape of solvent vapor through the molten resin outlet.

It is possible for the incoming resin that is added to the agitated body or bodies of already molten resin to be in the form of a solution of the resin in the volatile solvent from which it is to be separated. Even such large amounts of solvent as are necessary to form a liquid solution of the resin are separated quite readily in accordance with my new method. Consequently the invention may be used as a final step in the process described in the above-mentioned copending application Serial No. 677,393 for separating the resin from the solvent and for separately recovering the resin as a melted product and the solvent for re-use in the process.

The new melting method may be carried out as a continuous process, by continuously adding fresh resin to be melted to the agitated body of molten resin, and continuously withdrawing melted resin from beneath the surface of the body in which it is melted, or from the quiescent body, or from the communicating body in the sump.

The apparatus of the invention comprises a vessel adapted to contain molten resin, having therein at least one partition dividing the vessel into at least two chambers (each of which may contain a body of molten resin). Agitator means are provided in the first of the chambers for agitating the body of molten resin therein. The partition is apertured below the normal melted resin level, to permit passage of melted resin from the first chamber to the second; and it is also apertured above the melted resin level to permit passage of vaporized volatile material from one chamber to the next. A sump extending downwardly from a second chamber, and communicating therewith, is preferably provided and is equipped with heating means to heat the resin that collects therein from the body of resin in the second chamber. Means are provided for withdrawing melted resin from near the bottom of the sump, and means for withdrawing vaporized volatile material from over the body in the second chamber also are provided.

An advantageous embodiment of the invention is described below, with reference to the accompanying drawings, in which Fig. 1 is an elevation of melting apparatus constructed in accordance with the invention, a portion of the melting vessel being shown in section;

Fig. 2 is a view taken for the most part along the section line 2—2 of Fig. 1;

Fig. 3 is a view looking at the left end of the apparatus shown in Fig. 1;

Figure 4:
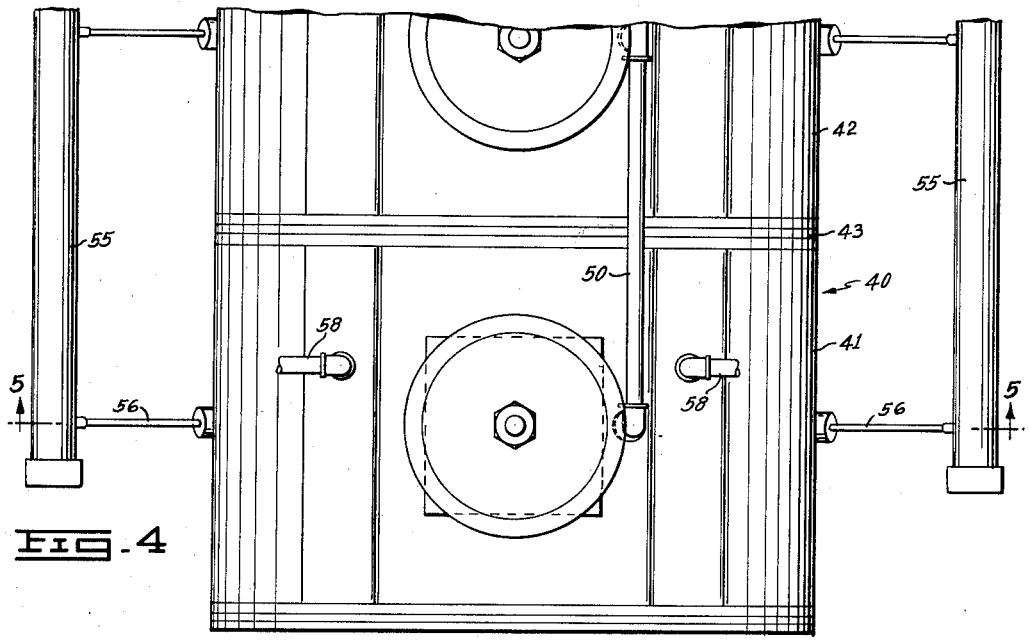
Fig. 4 is a plan of the melting chambers of a modified form of apparatus.

The apparatus shown in Figs. 1 to 3 comprises a vessel 10 supported above ground level on frame members 11. As shown in Fig. 1, the apparatus comprises three melting sections 12, 13, and 14, connected in series and to an end section 15. The chambers comprise drums, advantageously elliptical in cross section, provided with flanges 16 by which they may be bolted or otherwise detachably connected together. Partitions 17 are mounted between each of the sections 12, 13, 14 and 15 so as to divide the vessel into separate chambers. End plates 18 and 19 close the ends of the vessel.

The vessel is adapted to contain molten resin to a normal level 20. The partitions 17 are formed with apertures 21 below the normal resin level 20, thus providing for communication between the bodies of melted resin in the several sections of the vessel 10. The partitions 17 also are formed with apertures 22 above the normal level 20 of the melted resin, so that vaporized volatile material may pass from one section of the vessel to and through the others in the series.

The first three sections 12, 13 and 14 of the vessel 10 serve as resin-melting chambers, and are provided with heaters 23 for heating the bodies of molten resin established and maintained therein. The heaters shown in Figs. 1 and 2 are tube-type immersion unit heaters, heating of which may be electrical or by circulation therethrough of a hot fluid. The use of heaters of this type has the advantage of providing a large heating area in contact with a relatively small volume of melted resin, thereby permitting rapid and efficient heating of the resin without having to maintain the resin in the molten condition for a very long period of time.

Each of the melting sections 12, 13 and 14 is provided with a dome 24 through which an agitator shaft 25 extends. The outer end of each agitator shaft carries a pulley 26 by means of which it is driven, and inside the vessel it carries two agitator wheels 27 and 28. These agitator wheels may have the form of propellers, or any other form that produces vigorous agitation of the molten resin when the shaft 25 is rotated rapidly. The upper agitator wheel 27 is mounted about at the normal surface level of the molten resin, while the lower agitator wheel 28 is mounted well below the normal resin level and near the heating surfaces of the heaters 23.

Incoming resin to be melted is brought to the vessel through a feed pipe 29, from which branch pipes 30 deliver the resin to each melting section so that it falls to the upper surface of the body of molten resin near the upper agitator wheel 27.

It is evident from the foregoing description that each of the sections 12, 13 and 14 is in itself a melting chamber unit. Since the melting capacity of the apparatus depends on the number of such chamber units employed, it is possible to increase or decrease the melting capacity of apparatus by adding or taking away one or more such chamber units to or from the series thereof that go to make up the vessel 10.

The end section 15 of the vessel 10 differs from the melting chamber units described above in several respects. It is not provided with heaters, nor is it provided with any agitator means. Consequently the body of melted resin therein is maintained in a substantially tranquil or quiescent condition, and is unheated except insofar as heat is conducted to it from the adjoining bodies of resin with which it is in communication.

The section 15 communicates with a vapor exit chamber 31 of generous dimensions, through which low-boiling resin solvent or other volatile material vaporized in the melting vessel may be withdrawn. Offtake pipes 32 connected to the chamber 31 serve for carrying the solvent or other vapor to a condenser for its recovery, or elsewhere. Manways normally closed by cover plates 33 advantageously are provided so that access to the interior of the vessel may be had for cleaning purposes.

A sump 34 communicating with the interior of the end section 15 extends downwardly to a point well below the bottom of this section. A heater 35, advantageously of the immersion tube type, may be provided for heating the body of resin that collects in the sump. A resin outlet pipe 36 extending to near the bottom of the sump 34 provides for withdrawing melted resin from the apparatus and for discharging it, for example, into a drum 37 for shipping.

Figure 5:
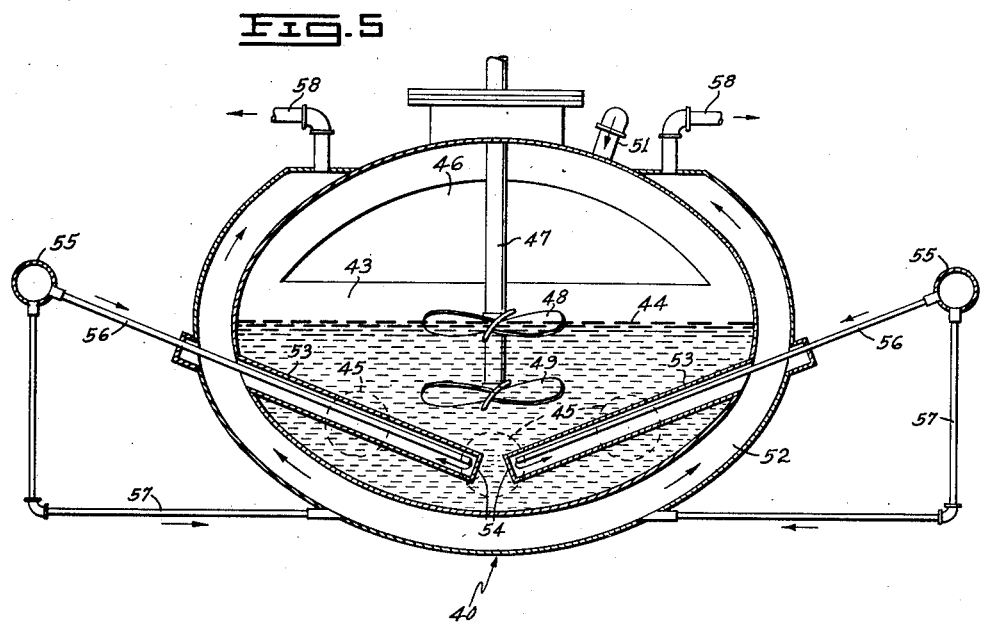
Fig. 5 is a section taken substantially along the line 5—5 of Fig. 4.

The apparatus shown in Figs. 4 and 5 is substantially the same as that described above, except for the arrangement for heating the molten resin contained in the melting sections. Like the apparatus described above, it comprises a vessel 40 divided into a plurality of sections 41, 42, etc., by partitions 43. The vessel is adapted to contain molten resin to a level 44, and communication between the bodies of resin in the several sections is provided by apertures 45 in the partitions 43 below the molten resin level. Apertures 46 above the molten resin level are provided in the partitions to permit vaporized volatile material to pass from one section to the next in the series. An agitator shaft extending into each melting section carries upper and lower agitator wheels 48 and 49, arranged substantially as described in connection with Figs. 1 to 3. Incoming resin is delivered to each melting section through a feed pipe 50 and branch pipes 51.

Each melting section 41, 42, etc., of the apparatus shown in Figs. 4 and 5 is provided with a heating jacket 52, and also with immersion heating tubes 53, which are closed at their inner ends 54 and communicate at their outer ends with the interior of the heating jacket 52. Heating fluid (e. g., steam, hot water or hot oil, or the like) is delivered by header pipes 55 to branch pipes 56 through which it is conducted directly to near the bottom of the heating tubes 53. At the same time, heating fluid is also delivered through other branch pipes 57 directly to the jacket 52 near the bottom of the vessel. Spent heating fluid, after passing through the tubes 53 to the jacket, or through the jacket itself, is withdrawn through heating medium exhaust pipes 58 connected to the jacket at an elevation above that at which the tubes 53 communicate therewith.

The apparatus shown in Figs. 4 and 5 operates in substantially the same manner as that shown in Figs. 1 to 3, and provides the advantages of electrical tube-type immersion heaters, but may be preferable in localities where electrical power costs are high.

The method of the invention is carried out in apparatus of the character described substantially as follows (particular reference is made to Figs. 1 to 3 in describing the method):

A body of molten resin is first established in the vessel 10 to a depth indicated by the surface level line 20. This may be accomplished by melting resin outside the apparatus and introducing it through the feed pipe 29 or through the manholes 33; or it may be accomplished by introducing resin, in the form in which it is to be melted, through the inlet pipe 29, and heating it in the vessel until it has melted. Once established, the body of molten resin is preferably maintained continuously at the operating temperature. If, for example, the resin is of the natural kauri type found in many Utah coals, and which have a melting temperature (i. e. are liquid enough to flow quite readily) at about 185° C., a satisfactory operating temperature range is from 200° C. to 225° C.

If operating conditions require it, the molten resin in the vessel may be allowed to cool and solidify without particular harm. Once it has been melted and freed from at least the low-boiling volatile material, it can be remelted, after solidifying, by means of the heaters imbedded in it, without great difficulty. Substantial time may, however, be required for remelting, and some injury may be done the resin by heating it for the length of time required for remelting. For this reason it is best not to allow the resin to solidify in the melting vessel if such can be avoided.

With the body of resin established in the vessel at the desired operating temperature, incoming resin is delivered, advantageously continuously, through the resin inlet pipe 29 and the branch pipes 30 to at least the first resin-melting section 12, and advantageously to all such sections 12, 13 and 14 of the apparatus. The incoming resin may be either in the form of solid material blown or otherwise forced through the pipe 29, or it may be in solution in the volatile low-boiling solvent. The resin (or resin-bearing solution) drops directly on to the upper surface of the body of hot molten resin, and the solvent is for the most part immediately flash-evaporated. The agitators 27 and 28 are rotated rapidly enough to cause vigorous agitation of the body of molten resin. The upper agitator 27 serves to break up any froth that tends to form and to cause immediate release of most, if not all, of the vaporized solvent. It also stirs the residual solid non-volatilized resin immediately into the body of molten resin, wherein it is quickly melted by direct contact with the already molten material. The lower agitator, by producing vigorous agitation of the molten resin at an appreciable depth below the surface and near the heaters 23, insures effective and rapid transfer of heat by convection from the heaters through the body of resin. Thus the molten resin itself serves effectively as the medium for transferring heat from the heaters to the fresh resin about to be melted, notwithstanding the rather poor heat conductivity of the resin even in the molten state.

A low-boiling solvent such as hexane is volatilized so rapidly and effectively when the resin with which it is present is introduced directly on to the surface of the vigorously agitated body of molten resin, that even a rather dilute solution of resin in such solvent may be delivered directly to the melting chambers. Substantially complete flash-evaporation of even such a relatively large amount of solvent is effected, and substantially complete recovery of the resin in the molten body of resin is achieved. Hence the method may be used as the final step in a resin recovery or refining process, involving dissolving the resin in a low-boiling solvent (as described in the above-mentioned copending application Serial No. 677,393), to effect separation and separate recovery of both the resin and the solvent.

The volatile material vaporized in the melting units 12, 13 and 14 passes through the upper apertures 22 in the partitions 17 to the vapor outlet chamber 31, and thence through the pipes 32 to the condensers in which the volatile material is recovered, or to waste if recovery is not worthwhile.

As resin is introduced into and melts in the melting chambers 12, 13 and 14, molten resin passes through the apertures 21 in the partitions 17 below the molten resin level 20 to the unheated end section 15. As there are no agitators in this section, and as the body of resin therein is quite effectively isolated by the partitions 17 from the effect of the agitators in the melting sections 12, 13 and 14 of the vessel, the body of molten resin in the end section 15 is substantially quiescent. Here any solvent vapor that has been stirred by the agitators into the body of molten resin, or that for some other reason has not escaped in the melting chambers, is enabled to do so, and to pass into the vapor outlet chamber 31.

The partition 17 that is between the end section 15 and the adjoining melting section 14 is, of course, the most important of the series of partitions, because it separates a vigorously agitated melting chamber from the chamber in which the resin is held in a substantially tranquil or quiescent state. Hence the apertures 21 and 22 therein should be respectively well below and well above the molten resin level 20, and no apertures should be present very near this level. The other partitions 17 between adjoining melting sections may be omitted from the apparatus if desired, although they serve the useful purpose of dividing the molten resin in the melting sections of the vessel into a series of relatively small bodies that are particularly easy to agitate and heat. It is sometimes desirable to heat the body of resin in each resin-melting chamber to a somewhat higher temperature than prevails in the preceding chamber in the series, so that a temperature gradient increasing from the first chamber 12 to the last chamber 14 in the series is established in the vessel. This is particularly desirable whenever the resin contains a relatively high-boiling volatile contaminant, because it facilitates rapid and complete elimination of such contaminant from the resin. The presence of partitions 17 between each melting chamber 12, 13, and 14 facilitates establishing such a temperature gradient.

The end section 15, in which the body of molten resin is substantially quiescent, is preferably unheated except to the extent that the resin therein is in communication with heated sections of the vessel, as I have found that this leads to more effective escape of residual solvent vapor.

The only outlet for molten resin entering the end section 15 is into the sump 34, and it is from this sump that the resin is withdrawn for casting into drums for shipping, or into other containers. Since the resin is withdrawn from near the bottom of the sump and the gaseous solvent rises, there is little opportunity for any solvent vapor to flow out through the pipe 36 with the molten resin. The resin in the sump may be heated by the heater 35 to a higher temperature than elsewhere in the apparatus for ease in withdrawing and casting it.

Since the bottom of the sump is the lowest point in the system, it is convenient for use in draining the molten resin from the apparatus when such is desired for cleaning or other purposes. Much of the molten resin can be drained by syphon action of the discharge pipe 36, and complete drainage may be effected by removing the sump bottom plate, or through a drain cock provided in the sump bottom. The pipe 36, which extends almost to the bottom of the sump, provides a gas seal preventing escape of vapors of volatile material through the pipe when only a small amount of molten resin or resin solution has collected in the bottom of the sump, when the apparatus is refilled.

The new melting method results in virtually complete elimination of low-boiling volatile material from the resin, even when the amount of such volatile material is sufficient in amount to form a liquid solution of the resin. Hence the melted resin product is substantially pure. Substantially complete elimination of low-boiling resin solvent is important, as the presence in the resin product of any foreign material that lowers its melting point lessens its commercial value.

The new melting method may be carried out continuously, thus making it well adapted for large scale melting operations, and in the final stage of a continuous resin-refining process.

The new apparatus enables the method of the invention to be carried out with but a small volume of molten resin in relation to the amount of resin that can be melted. This it accomplishes by providing a large total area of heating surface in the melting sections in relation to the volume of molten resin therein. Consequently the rate at which the resin passes through the apparatus is high, and the resin is not heated at its melting point long enough to be affected deleteriously. The vigorous agitation provided by the new apparatus, in conjunction with the large amount of heating area relative to the volume of resin in the several bodies thereof, insures rapid heating of the resin to its melting temperature without permitting any local overheating, with consequent danger of damage to the resin.

It is evident from the foregoing that the new method and the new apparatus are effective for producing, efficiently and economically, a melted resin product of high quality.

I claim:

1. The method of reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises establishing and maintaining a molten body of the resin, applying heat to said body of molten resin, agitating the body of molten resin sufficiently to facilitate distribution therethrough of said applied heat, introducing the resin solution to be evaporated onto the surface of said body at a rate such as to maintain said mass of froth, vigorously agitating the resulting froth adjacent the surface of said body, whereby separation of the solvent and resin is effected by volatilization of the solvent and melting of the residual resin, and withdrawing molten resin from said body thereof.

2. The method of reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises establishing and maintaining a molten body of the resin, applying heat to the interior of said body of molten resin, agitating the body of molten resin sufficiently to facilitate distribution therethrough of said applied heat, introducing the resin solution to be evaporated onto the surface of said body at a rate such as to maintain said mass of froth, vigorously agitating the resulting froth adjacent the surface of said body, whereby separation of the solvent and resin is effected by volatilization of the solvent and melting of the residual resin, and withdrawing molten resin from said body thereof.

3. The method of reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises establishing and maintaining a molten body of the resin, applying heat to the interior of said body of molten resin, agitating the body of molten resin sufficiently to facilitate distribution therethrough of said applied heat, introducing the resin solution to be evaporated onto the surface of said body at a rate such as to maintain said mass of froth, vigorously agitating the resulting froth adjacent the surface of said body, whereby separation of the solvent and resin is effected by volatilization of the solvent and melting of the residual resin, continuously transferring the molten resin from said agitated body to a relatively quiescent zone wherein any volatilized solvent physically entrapped therein may escape and thereby form a body of the resin in molten condition substantially free from said solvent, and withdrawing molten resin from said quiescent body thereof.

4. The method of reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises establishing and maintaining a molten body of the resin, applying heat to said body of molten resin, agitating the body of molten resin sufficiently to facilitate distribution therethrough of said applied heat, introducing the resin solution to be evaporated onto the surface of said body at a rate such as to maintain said mass of froth, vigorously agitating the resulting froth adjacent the surface of said body, whereby separation of the solvent and resin is effected by volatilization of the solvent and melting of the residual resin, continuously transferring the molten resin from said heated body thereof to a relatively quiescent zone wherein the molten resin is heated only indirectly by its communication with said heated body of resin, whereby any volatilized solvent physically entrapped therein may escape, and withdrawing molten resin from said quiescent body thereof.

5. The method of reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises establishing and maintaining first, second and third molten bodies of the resin, applying heat to the first and third of said bodies of molten resin, the second body of molten resin being heated substantially only by its communication with the other heated bodies thereof, said third body extending to a bottom level below the bottom level of the first and second bodies, agitating the first body of molten resin sufficiently to facilitate distribution therethrough of said applied heat, introducing the resin solution to be evaporated onto the surface of said first body at a rate such as to maintain said mass of froth, vigorously agitating the resulting froth adjacent the surface of said body, whereby separation of the solvent and resin is effected by volatilization of the solvent and melting of the residual resin, and withdrawing molten resin from near the bottom level of said third body.

6. In a process for the recovery of a refined resin product, involving extracting the resin with a solvent having a boiling point substantially below the melting temperature of the resin, the step of concurrently evaporating the solvent from the resin solution and recovering the resin in a melted substantially solvent-free condition, the evaporation of the resin solution being characterized by passing through a stage wherein volatilized solvent produces a voluminous froth composed of bubbles of viscous resin solution, which comprises establishing and maintaining a molten body of the resin, applying heat to said body of molten resin, agitating the body of molten resin sufficiently to facilitate distribution therethrough of said applied heat, introducing the resin solution to be evaporated onto the surface of said body at a rate such as to maintain said mass of froth, vigorously agitating the resulting froth adjacent the surface of said body, whereby separation of the solvent and resin is effected by volatilization of the solvent and melting of the residual resin, and withdrawing molten resin from said body thereof.

7. Apparatus for reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises a vessel adapted to contain a mass of the resin in molten condition, at least one substantially vertically disposed apertured partition positioned within the vessel and dividing said vessel into at least two separate but communicating molten resin-containing compartments, an agitator disposed within one of the compartments and adapted to effect vigorous agitation of a body of molten resin therein, heating means for said agitated body of molten resin, supply means for introducing the resin solution onto the surface of the agitated body of molten resin, a second agitator disposed above the first-mentioned agitator and adapted to effect vigorous agitation of froth formed adjacent the surface of the agitated body of molten resin by volatilization of solvent contained in said resin solution, the other compartment being free of agitating means, and discharge means for withdrawing substantially solvent-free molten resin from said other compartment.

8. Apparatus for reducing to the molten condition a resin in solution in a solvent therefor with separation of the solvent from the resin, the evaporation of the resin solution being characterized by passing through a stage wherein volatilized solvent produces a voluminous froth composed of bubbles of viscous resin solution, which comprises a vessel adapted to contain a mass of the resin in molten condition, at least one substantially vertically disposed apertured partition positioned within the vessel and dividing said vessel into at least two separate but communicating molten resin-containing compartments, an agitator disposed within one of the compartments and adapted to effect vigorous agitation of a body of molten resin therein, heating means disposed within the vessel in such manner as to apply heat to the interior of said agitated body of molten resin, supply means for introducing the resin solution onto the surface of the agitated body of molten resin, a second agitator disposed above the first-mentioned agitator and adapted to effect vigorous agitation of froth formed adjacent the surface of the agitated body of molten resin by volatilization of solvent contained in said resin solution, the other compartment being free of agitating means, and discharge means for withdrawing substantially solvent-free molten resin from said other compartment.

9. Apparatus for reducing to the molten condition a resin in solution in a solvent therefor with separation of the solvent from the resin, the evaporation of the resin solution being characterized by passing through a stage wherein volatilized solvent produces a voluminous froth composed of bubbles of viscose resin solution, which comprises a vessel adapted to contain a mass of the resin in molten condition, at least one substantially vertically disposed apertured partition positioned within the vessel and dividing said vessel into at least two separate but communicating molten resin-containing compartments, an agitator disposed within one of said compartments and adapted to effect vigorous agitation of a body of molten resin therein, heating means for said agitated body of molten resin, supply means for introducing the resin solution onto the surface of the agitated body of molten resin, an agitator disposed within the vessel and so positioned as to effect vigorous agitation of froth formed adjacent the surface of the body of molten resin by volatilization of solvent contained in said resin solution, the other compartment being free of agitating means, a sump extending downwardly to a level well below the bottom of the vessel and communicating with said other compartment, heating means for molten resin within the sump, and discharge means for withdrawing substantially solvent-free molten resin from near the bottom of said sump.

10. Apparatus for reducing to the molten condition a resin in solution in a solvent therefor with removal of the solvent from the resin, the evaporation of the resin solution being characterized by passing through a stage wherein volatilized solvent produces a voluminous froth composed of bubbles of viscous resin solution, which comprises a vessel adapted to contain a mass of the resin in molten condition, said vessel being composed of an end chamber provided with means for withdrawing molten resin and volatilized solvent and a plurality of resin melting chambers connected together in series and to said end chamber, each of said series of melting chambers comprising a unit chamber detachably joined with other like units whereby the resin melting capacity of the apparatus may be increased or decreased by adding or removing one or more such chamber unit to or from the series thereof, a substantially vertically disposed apertured partition positioned within the vessel between the end chamber and the adjacent melting chamber and dividing said chambers into two separate but communicating molten resin-containing compartments, heating means for said melting chamber, supply means for introducing the resin solution onto the surface of the body of molten resin in the melting chamber, an agitator disposed within the melting chamber and so positioned as to effect vigorous agitation of froth formed adjacent the surface of the body of molten resin by volatilization of solvent contained in said resin solution, the end chamber being free of agitating means, and discharge means for withdrawing substantially solvent-free molten resin from said end chamber.

ERNEST KLEPETKO.

REFERENCES CITED

The following references are of record in the file of this patent:

UNITED STATES PATENTS

| Number | Name | Date |
|---|---|---|
| 829,954 | Edson | Sept. 4, 1906 |
| 1,678,819 | Koch | July 31, 1928 |
| 1,929,691 | Hutteman | Oct. 10, 1933 |
| 2,001,658 | Williams | May 14, 1935 |
| 2,029,691 | Robinson | Feb. 4, 1936 |
| 2,086,072 | Fauth et al. | July 6, 1937 |
| 2,128,569 | Velz | Aug. 30, 1938 |
| 2,140,514 | Cline | Dec. 20, 1938 |
| 2,182,428 | Fladmark | Dec. 5, 1939 |
| 2,227,605 | Swallen et al. | Jan. 7, 1941 |
| 2,326,099 | Kokatnur et al. | Aug. 3, 1943 |
| 2,263,534 | Aldridge | Nov. 18, 1944 |
| 2,409,216 | Lee | Oct. 15, 1946 |
| 2,445,919 | Mitchell | July 27, 1948 |
| 2,460,083 | Harbaugh | Jan. 25, 1949 |